(12) United States Patent
Michelbach et al.

(10) Patent No.: US 6,459,074 B1
(45) Date of Patent: Oct. 1, 2002

(54) ENCAPSULATION FOR THE CONNECTION END OR THE TERMINATION END OF AN ELECTRIC STRIP HEATER CABLE, AND A METHOD FOR PRODUCING IT

(75) Inventors: Thomas Michelbach, Lauda-Beckstein (DE); Mario Colpa, Yverdon-les-Bains; Werner Bolleter, Zürich, both of (CH)

(73) Assignee: Bacab SA, Sainte-Croix (CH)

( * ) Notice: Subject to any disclaimer, the term of this patent is extended or adjusted under 35 U.S.C. 154(b) by 0 days.

(21) Appl. No.: 09/624,143

(22) Filed: Jul. 21, 2000

(30) Foreign Application Priority Data

Jul. 22, 1999 (CH) .............................. 1341/99

(51) Int. Cl.[7] ................................ H05B 3/08
(52) U.S. Cl. ........................ 219/541; 219/542
(58) Field of Search .................. 219/541, 549, 219/544, 542

(56) References Cited

U.S. PATENT DOCUMENTS 2,587,916 A * 3/1952 Squier ..................... 338/26
5,394,507 A * 2/1995 Okamoto ................ 392/480
6,005,232 A * 12/1999 Janvrin ................... 219/549
6,126,483 A * 10/2000 Kirma .................... 439/587

FOREIGN PATENT DOCUMENTS

| DE | G8503674.9 | 6/1985 |
| DE | 3644609 A1 | 7/1988 |
| FR | 2 683 419 | 5/1993 |
| GB | 1167343 | 10/1969 |

* cited by examiner

*Primary Examiner*—Teresa Walberg
*Assistant Examiner*—Vinod D. Patel
(74) *Attorney, Agent, or Firm*—Morgan, Lewis & Bockius LLP

(57) ABSTRACT

An encapsulation for the connection end or the termination end of a strip heater cable includes a moulded part, in which the strip heater cable has a core, including a plurality of electric conductors, and over the core, an insulating outer sheath made from a thermoplastic fluoropolymer material. The moulded part includes the same fluoropolymer material as the insulating outer sheath. The moulded part holds an end section of the core of the strip heater cable and is welded to the insulating outer sheath, such that the connection end or the termination end is sealed in a hermetically tight fashion.

13 Claims, 2 Drawing Sheets

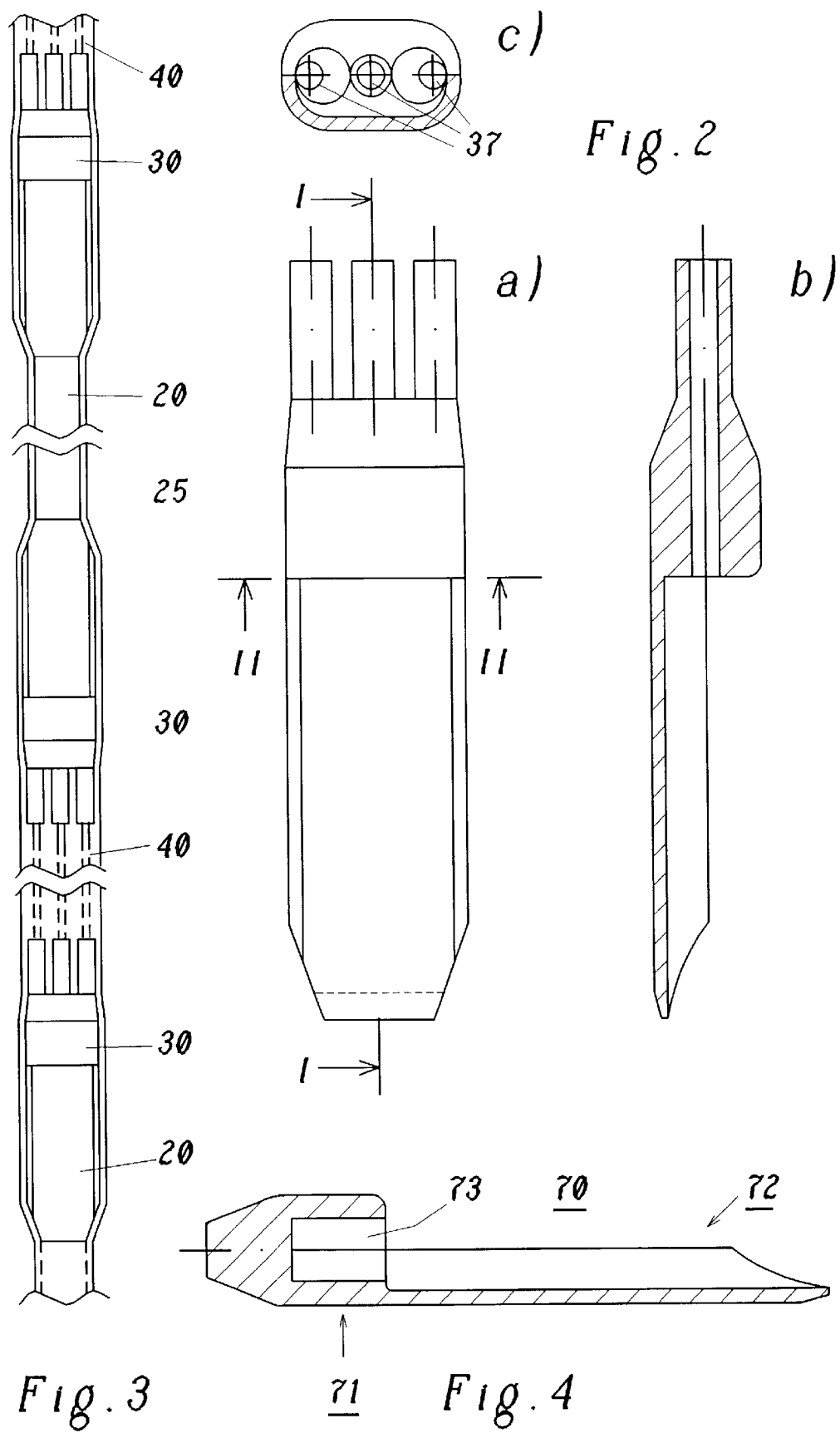

ENCAPSULATION FOR THE CONNECTION END OR THE TERMINATION END OF AN ELECTRIC STRIP HEATER CABLE, AND A METHOD FOR PRODUCING IT

BACKGROUND OF THE INVENTION

1. Field of the Invention

The present invention relates to an encapsulation for the connection end or the termination end of an electric strip heater cable which in the core has a plurality of electric conductors, and over the core has an insulating outer sheath made from a thermoplastic fluoropolymer material. The invention also relates to a method for producing such an encapsulation.

2. Discussion of the Related Art

Normally, with the strip beater cables of the type considered two of the conductors are arranged inside and parallel to one another; they are also denoted as bus wires. The latter are embedded, for example, in a plastic material which is constructed to be weakly conducting by means of appropriate additives. If a voltage is applied to the two bus wires (for example a normal AC supply voltage), a loss-affected flow of current arises between the two bus wires through the weakly conducing material, and heat losses are produced. This type of strip heaters is also denoted as self-limiting strip heater cables or as parallel conductor heaters. Instead of being connected via a poorly conducting plastic material, the two bus wires could also be connected via a resistance wire which is wound around them and welded to them at regular intervals.

Strip heater cables of the type considered are usually also further shielded in the manner of a coaxial cable, and therefore also have a conducting layer, for example in the form of a wire mesh, over an intermediate insulation. Only then is the abovementioned outer sheath fitted over this shield.

In order to connect the two bus wires and the shield, these are exposed to a small extent and then connected individually to pigtail leads, for example via crimp conductors. For the purpose of insulation and for protection against external influences, the connecting region is subsequently mostly encapsulated, and this is usually performed simply by bonding. The free ends of the strip heaters are also encapsulated by bonding.

Because of their specific surface properties, the very temperature-resistant thermoplastic fluoropolymers mentioned at the beginning can, however, be bonded tightly and durably only conditionally with an extremely low adhesion using current adhesion methods, In particular, encapsulations produced in this way are very sensitive to mechanical loads.

SUMMARY OF THE INVENTION

The encapsulation proposed by the invention comprises a moulded part made from a thermoplastic fluoropolymer material which can be welded to that of the outer sheath of the strip heater cable and is durably welded in a hermetically tight fashion. The encapsulation according to the invention is suitable, in particular, for applications in a rugged environment and the environment which poses stringent safety requirements, such as in aeroplane manufacture.

In the case of strip heaters of the type considered, the outer sheath is usually extruded onto the core containing the conductors. The moulded part used for the encapsulation according to the invention is preferably shaped such that it can also traverse the extruder during the extrusion process of the strip heater outer sheath, and is thereby likewise sheathed by the strip heater outer sheath.

Advantageous, and therefore preferred refinements and improvements of the invention are respectively characterized in the dependent claims.

BRIEF DESCRIPTION OF THE DRAWINGS

The invention is to be explained in more detail below with the aid of exemplary embodiments in conjunction with the drawing, in which:

FIG. 2 shows a moulded part for an encapsulation in accordance with FIG. 1, specifically a) in the top view, b) in the section I—I, and c) in the section II—II;

FIG. 3 shows sections of an endless strip assembled from a plurality of strip heater cables and pigtail leads with a uniform outer sheath extruded on beyond the connecting points; and FIG. 4 shows a moulded part for an encapsulation according to the invention at the termination end of a strip heater cable.

DETAILED DESCRIPTION OF THE PREFERRED EMBODIMENTS

Figure 1:
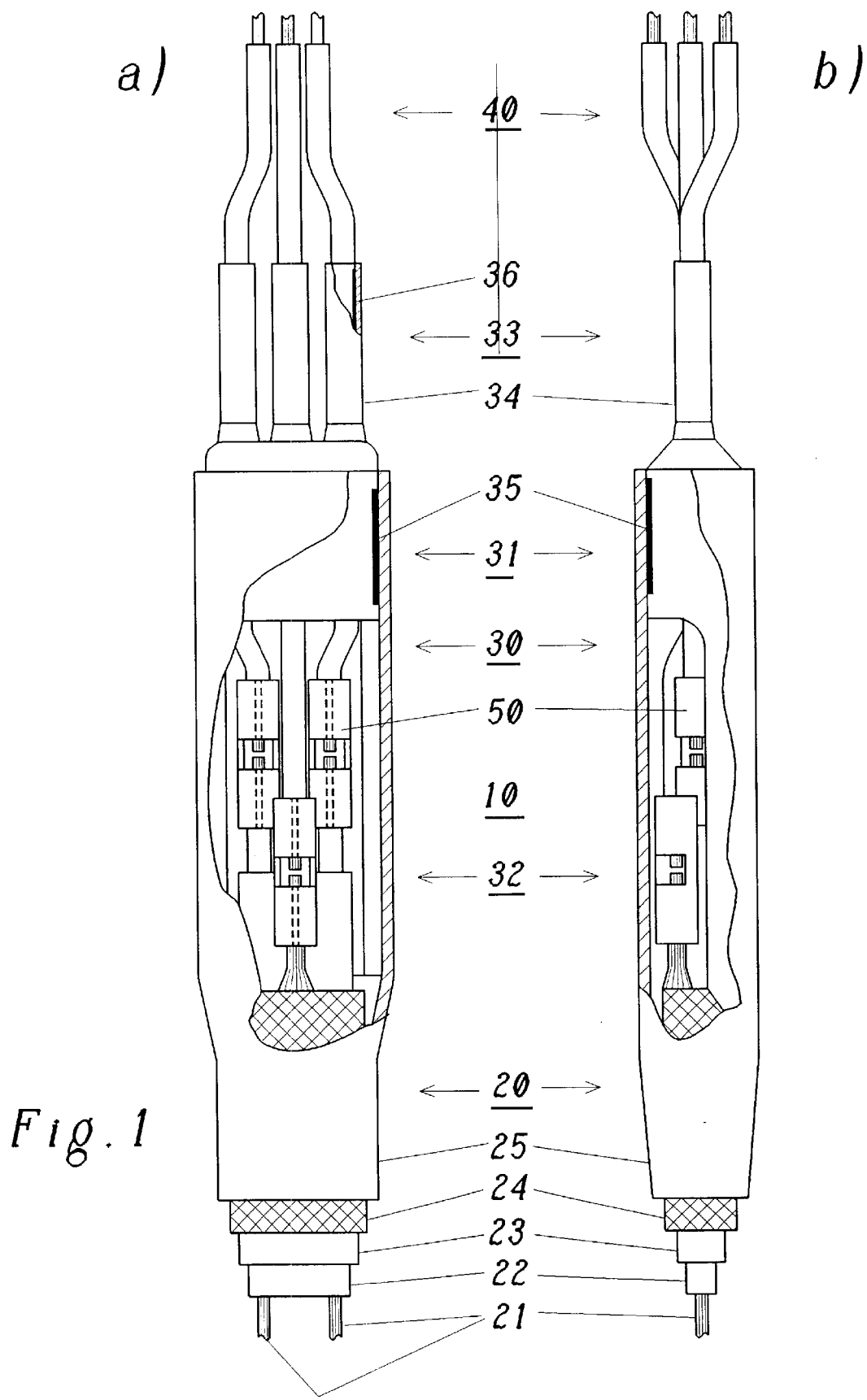
FIG. 1 shows a partially cut away encapsulation according to the invention at the connection end of a strip heater cable, specifically a) in a top view and b) in a side view.

In FIG. 1, 10 denotes an encapsulation according to the invention at the connection end of a strip heater cable 20. Only a short section of the strip heater cable 20 is illustrated. In addition, its components are drawn with different lengths in order to make them recognizable individually. The strip heater cable 20 has a core which comprises two mutually parallel conductors (bus wires) 21 embedded in a type of resistance material (core material) 22, an insulation 23 and a shield 24. The core is surrounded by an outer sheath 25 made from a thermoplastic fluoropolymer. It is likewise possible to use a thermoplastic polymer for the core material 22 and the insulation 23, it then being necessary to provide the core material with certain additives so as to render it partially conductive.

30 denotes a moulded part which has a middle section 31 and two further sections 32 and 33 bordering both ends of the middle section 31, respectively. The middle section 31 is of relatively solid construction except for three through openings (37 in FIG. 2), and has a cylindrical lateral surface. The section 32, bordering on the middle section 31, on the strip heater side is constructed approximately in the shape of a half shell. In the section 33, three tubular glands 34 are integrally formed on the middle section 31 in a fashion aligned with the through openings thereof.

Three individually insulated pigtail leads 40 are guided through the tubular glands 34 and the through openings in the middle section 31 of the moulded part 30. The material for the insulating wrappers of these pigtail leads is, once again, a thermoplastic fluoropolymer, which is compatible in terms of welding with the material of the moulded part 30. The stripped ends of the pigtail leads 40 are connected in the region 32, constructed in the shape of a half shell, of the moulded pad 30 to the ends, likewise exposed, of the strip heater conductors 21 and to a twisted end of the shield 24 via crimp connectors 50. The crimp connectors 50 are provided on the outside with an insulating layer and, as illustrated in FIG. 1, can therefore be accommodated bearing against one another in a fashion which is space saving and positionally stabilized in the section 32 in the shape of a half shell.

The outer sheath 25 of the strip heater cable 20 is drawn forwards over the section 32, constructed in the shape of a half shell, of the moulded part 30 and the crimp connectors 50, arranged therein, up to the middle section 31 and welded there to the cylindrical lateral surface of this section over the entire circumference thereof. Furthermore, the tubular glands 34 are also respectively welded over the entire circumference to the insulating wrappers of the pigtail leads 40. One of these welds is indicated diagramatically and denoted 36. The welds are possible because use is made for the moulded part 30, the strip heater outer sheath and the insulating wrappers of the pigtail leads either of the same material, but in any case of material which is mutually compatible in terms of welding.

The strip heater outer sheath 25 forms in the way described together with the moulded part 30 a hermetically gas-tight and moisture-tight encapsulation for the connection region between the strip heater conductors 21, 24 and the pigtail leads 40. This is very important, because moisture in the connecting region can lead to so-called arc tracking in the strip heater cable (a type of propagating cable fire). In some circumstances, the access of salt-containing atmospheric moisture can already suffice for this. The temperature resistance of the fluoropolymer material also renders the encapsulation exceptionally temperature resistant. Good mechanical stability, which is also capable of resisting bending and vibrational loads, results from the welding 35 of the outer sheath 25 onto and to the relatively solid middle part 31, and from acceptance of the crimp connectors in the section 32 in the shape of a half shell.

In order to avoid the abovementioned arc tracking even if, for example after damage to tile strip heater outer sheath 25, moisture penetrates somewhere into the cable and, for example, along the shield thereof into the connecting region, it can additionally be provided also to fill the encapsulation with a sealing means. By way of example, a suitable sealing means is a polyurethane gel. This is flexible and reliably seals the conductor connections in the encapsulation. On the other hand, the connection region can also be filled in with a temperature-resistant epoxy resin or a cyanoacrylate adhesive. However, these insulation materials are or become firm and seal only when they adhere to a certain extend to the fluoropolymer material in the connecting region. However, owing to the embedding in the outer encapsulation, the mechanical strength of is adhesion is far less critical than in the case of the prior art mentioned at the beginning, where exclusive use is made of such adhesives, The adhesion of these materials can, furthermore, be farther improved by a prior corona treatment or plasma treatment of the fluoropolymer material.

FIG. 2 shows three views of a moulded part 30 such as is preferably used for an encapsulation 10 according to the invention. The above explanations related to the moulded part 30 of FIG. 1 can be understood even better with the aid of this illustration. In particular, the through openings 37 for the pigtail leads 40 in the middle section 31 of the moulded part 30 are also to be recognized in FIG. 2c.

The aim is now to use FIG. 3 to explain how an encapsulation according to the invention can be produced in a particularly simply way. In this case, as a first step a multiplicity of strip heater core parts (components 21–24), pigtail leads 40 and moulded parts 30 are connected with each two connection ends and two termination ends directed against one another to form a quasi-endless strip, as may be seen in FIG. 3. A suitable extruder is then used to continuously extrude the outer sheath 25 onto the strip, that is to say also beyond the moulded parts 30 and the pigtail leads 40. In order to render this possible, or to facilitate it, the moulded part 30 is preferably constructed as an elongate part with approximately the same cross section as the strip heater cable 20. Subsequently, the strip thus obtained is subdivided into individual sections, specifically such that in each case a piece of the strip heater cable 20 with an encapsulation 10 according to the invention at at least one end is obtained. The part of the outer sheath 25 which covers the tubular glands 34 and the pigtail leads 40 is then removed. Finally, the abovementioned welding operations are further undertaken.

FIG. 4 shows a moulded part 70 such as is used advantageously for an encapsulation according to the invention at the termination end of the strip heater cable. The moulded part 70 once again consists of a thermoplastic fluoropolymer material. Unlike the moulded part 30, the moulded part 70 has no tubular glands, and also has in its section 71 only one blind bore 72 into which an end of a strip heater core can be plugged. A section 72, in the shape of a half shell, corresponding to the section 32 of the moulded part 30 is, however, provided. As in the case of the previously described encapsulation at the connection end, here, as well, the outer sheath of the strip heater cable is drawn forward into the region of the section 71 and welded there to the lateral surface of the moulded part 70.

What is claimed is:

1. An encapsulation for a connection end or a termination end of an electric strip heater cable wherein the electric strip heater cable comprises a core having a plurality of electric conductors, and over the core, an insulating outer sheath made from a thermoplastic fluoropolymer material, comprising:

a moulded part for holding an end section of the core, wherein the moulded part is made from the thermoplastic fluoropolymer material, and welded to the insulating outer sheath to surround the connection end or the termination end in a hermetically tight fashion.

2. The encapsulation according to claim 1, wherein the moulded part farther comprises a first section with a cylindrical lateral surface;

a second section bordering an end of the first section on the strip heater side and constructed in the shape of a half shell, wherein an end section of the strip heater core is inserted into the second section, and the strip heater outer sheath is guided away over the second section and is welded beyond the second section to the cylindrical lateral surface of the first section.

3. The encapsulation according to claim 2, wherein at the connection end of the strip heater cable free ends of the conductors of the strip heater cable are individually connected to stripped ends of insulated pigtail leads, the pigtail leads being guided through at least one opening in the first section of the moulded part.

4. The encapsulation according to claim 3, wherein the free ends of the conductors of the strip heater cable are connected via crimp connectors to the stripped ends of the pigtail leads and in that the crimp connectors are arranged in the second section, in the shape of a half shell, of the moulded part.

5. The encapsulation according to either of claims 3 and 4, wherein the moulded part further comprises a third section bordering another end of the first section, wherein in the third section, the moulded part has a plurality of tubular glands, integrally formed on the first section, for guiding through the pigtail leads.

6. The encapsulation according to claim 5, wherein the pigtail leads further comprises an insulation include the thermoplastic fluoropolymer material, and wherein the insulation of the pigtail leads in the third section is tightly welded to the inner surface of the glands.

7. The encapsulation according to one of claims 1–4, wherein the end section of the strip heater core in the moulded part is sealed with the aid of a sealing means, in particular a polyurethane gel or a heat-resistant epoxy resin or cyanacrylate adhesive.

8. The encapsulation according to one of claims 1–4, wherein the core of the strip heater cable has two parallel conductors, provided for conducting current and embedded parallel next to one another in a resistance material, an insulation surrounding these conductors, and a conducting shield around said insulation.

9. The encapsulation according to claim 1 or 2, wherein at the termination end of the strip heater cable, the end section of the strip heater core in the moulded part is plugged from its second section into a blind bore in its first section.

10. The encapsulation according to one of claims 1 to 4, wherein the moulded part is constructed as an elongate part with approximately the same cross section as the strip heater cable.

11. A method for producing an encapsulation according to one of claims 1–4, wherein together with the core of the strip heater cable the moulded part traverses an extruder during application of the strip heater outer sheath.

12. The method for producing an encapsulation according to claim 11, wherein the outer sheath of the strip heater cable is welded to the moulded part by means of a heatable double-jaw tool, the welding preferably being performed in two stages in such a way that in the first stage the fluoropolymer material of the moulded part and of the outer sheath is only partly fused, fusing together occurring only in the second stage under the influence of pressure.

13. The method for producing an encapsulation according to claim 12, wherein the insulation of pigtail leads is welded to an inner surface of the glands in a separate welding operation.

\* \* \* \* \*